United States Patent
Do et al.

(10) Patent No.: US 10,383,072 B2
(45) Date of Patent: Aug. 13, 2019

(54) METHOD AND SYSTEM FOR SYNCHRONIZATION OF SENSING OPERATIONS PERFORMED BY A PLURALITY OF DEVICES

(71) Applicant: QUALCOMM Incorporated, San Diego, CA (US)

(72) Inventors: Ju-Yong Do, Cupertino, CA (US); Sai Pradeep Venkatraman, Santa Clara, CA (US); Weihua Gao, San Jose, CA (US); Gengsheng Zhang, Cupertino, CA (US); Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 15/635,830

(22) Filed: Jun. 28, 2017

(65) Prior Publication Data

US 2019/0007912 A1    Jan. 3, 2019

(51) Int. Cl.
*H04J 3/06* (2006.01)
*H04W 56/00* (2009.01)
*H04W 64/00* (2009.01)

(52) U.S. Cl.
CPC ....... *H04W 56/001* (2013.01); *H04W 64/003* (2013.01)

(58) Field of Classification Search
CPC .......... H04B 7/2662; H04J 2011/0096; H04W 24/10; H04W 56/001; H04W 56/0045; H04W 56/006; H04W 64/00; H04W 64/003; H04W 80/04; H04W 84/12; H04W 84/18; H04W 88/06; H04W 88/08
See application file for complete search history.

(56) References Cited

U.S. PATENT DOCUMENTS

| | | | |
|---|---|---|---|
| 8,903,954 B2 | 12/2014 | Luna et al. | |
| 9,392,567 B2 | 7/2016 | Bhatia | |
| 9,503,858 B2 | 11/2016 | Palanki et al. | |
| 10,034,144 B2* | 7/2018 | Agarwal | G06Q 50/01 |
| 2013/0342391 A1 | 12/2013 | Hoang et al. | |
| 2016/0066151 A1* | 3/2016 | Palanki | H04L 67/10 |
| | | | 455/456.1 |
| 2016/0345277 A1 | 11/2016 | Segev | |
| 2018/0020329 A1* | 1/2018 | Smith | H04W 4/029 |
| 2018/0035258 A1* | 2/2018 | Pon | H04L 43/16 |

OTHER PUBLICATIONS

Chatzimilioudis et al, Crowdsourcing with Smartphones, IEEE, 7 pages, 2011.*

* cited by examiner

*Primary Examiner* — Frank Duong
(74) *Attorney, Agent, or Firm* — Thien T. Nguyen

(57) ABSTRACT

Disclosed is an apparatus and method for synchronization of sensing operations performed by a plurality of devices. The method may include collecting sensing capabilities of one or more connected devices that are communicably coupled with a central device. Each connected device may include one or more sensors, and the sensing capabilities may include at least sensor type and sensing interval for each sensor. The method may also include coordinating sensing operations performed by the central device and the one or more connected devices.

30 Claims, 12 Drawing Sheets

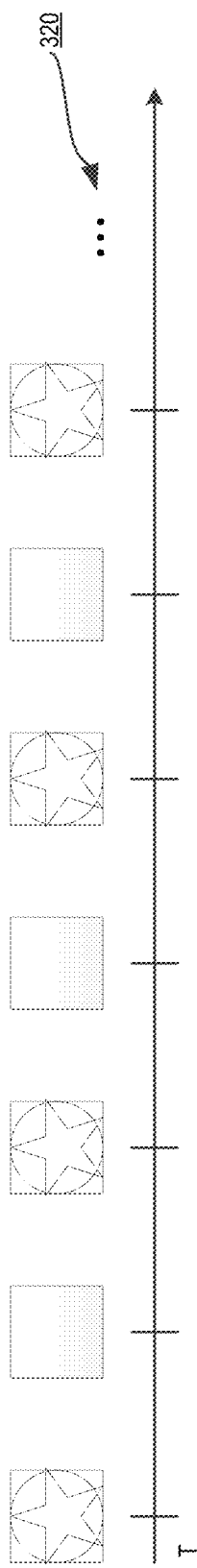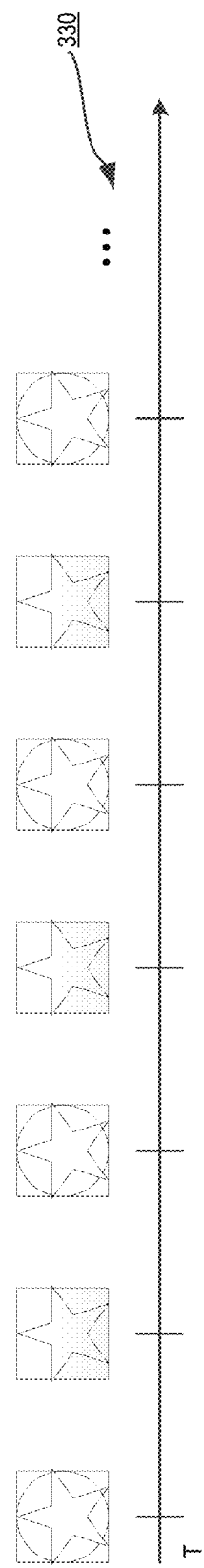

METHOD AND SYSTEM FOR SYNCHRONIZATION OF SENSING OPERATIONS PERFORMED BY A PLURALITY OF DEVICES

FIELD

The subject matter disclosed herein relates generally to mobile device positioning systems and methods.

BACKGROUND

Mobile positioning technologies enable a mobile device to approximate its real world location. A mobile device, such as a mobile telephone, can utilizes one or more positioning techniques, such as global navigation satellite system (GNSS) positioning, wireless network based positioning (e.g., positioning based on wireless network access points (APs), based on cellular network transmitters, etc.), as well as other positioning techniques. Mobile devices are becoming more sophisticated by including multiple different types of sensors (e.g., GNSS sensors, Bluetooth sensors, barometers, light sensors, imaging sensors, etc.). Some positioning techniques enable the mobile device to use additional sensor readings collected by the device to enhance and/or replace the positioning techniques noted above.

Furthermore, the internet of things (IOT) continues to expand enabling a user to communicatively connect one or more devices to a central device. For example, a central device may establish a personal area network with a plurality of different devices including, for example, a smart watch, a fitness tracker, smart glasses, etc. Each of these devices may include their own sensor(s) for performing operations at the connected devices. For example, a fitness tracker may utilize an accelerometer to count steps, smart glasses may use an image sensor to capture images, a smart watch may capture access point signals to perform navigation, etc. Typically, the central device and the connected devices operate independently of each other when performing their respective tasks.

BRIEF DESCRIPTION OF THE DRAWINGS

FIG. 3C is a symbolic representation of one embodiment of coordinated sensing by a central device and two connected devices;

FIG. 3D is a symbolic representation of another embodiment of coordinated sensing by a central device and two connected devices;

DETAILED DESCRIPTION

Methods and systems for a central device to manage synchronization of sensing of a plurality of connected devices are described. In one embodiment, the central device is mobile device, such as a mobile telephone, tablet computer, laptop computer, etc. Furthermore, the connected devices are also mobile devices periodically or continuously communicably coupled with the central device that can include one or more fitness trackers, smart watches, smart glasses, smart garments, medical devices, gaming devices, other wearable devices, etc. In embodiments, the central device may also be one of the connected devices with sufficient computing, memory, battery, and network resources to perform the processes discussed herein.

Figure 1:
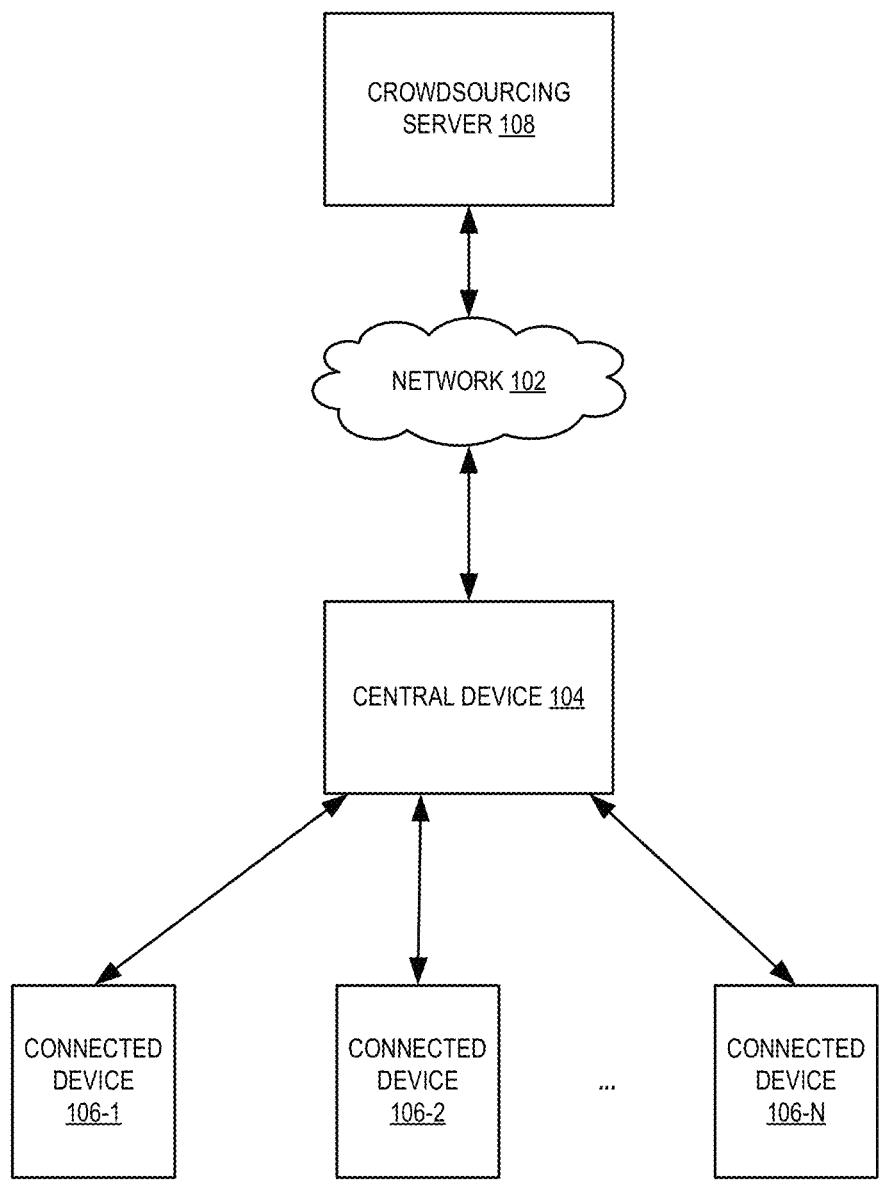
FIG. 1 illustrates one embodiment of a system for utilizing a central device to manage sensing operations performed by a plurality of connected devices.

FIG. 1 illustrates one embodiment of a system for utilizing a central device 104 to manage the scheduling applied to sensing operations performed by a plurality of connected devices (e.g., connected devices 106-1, 106-2, through 106-N).

In one embodiment, central device 104 establishes a network connection, such as a Bluetooth, near field communication, ZigBee, wireless local area network, other network connection, or a combination of network connections, with each connected device 106. In one embodiment, when the wireless network connection with a connected device (e.g., connected device 106-1) is established by central device 104, central device 104 can query each device for its sensing capabilities as part of the network connection handshaking process. In another embodiment, each connected device supplies the central device 104 with its respective capabilities automatically upon the establishment of the network connection or in response to a request of the central device 104. As discussed herein, sensing capabilities can include, for example, the sensors available at each connected device (e.g., accelerometer, barometer, GNSS, image, etc.), a frequency of sensing for each sensor (e.g., 1 second, 10 seconds, 1 minute, etc.), a range of feasible sensing frequencies (e.g., periodic sensing between 5-100 seconds, periodic sensing between 12-20 seconds, etc.), configuration capabilities of each sensor (e.g., an indication as to whether a sensor can be deactivated, sensing frequency altered, etc.), as well as other sensor capabilities. As discussed in greater detail below, central device 104 collects each connected device's sensor capabilities in order to enforce scheduled and coordinated sensing between each connected device 106 and the central device 104.

In one embodiment, central device 104 is capable of performing one or more positioning processes, such as a Global Navigation Satellite System (GNSS), Access Point (AP), peer-to-peer, and/or other positioning process, to determine a real-world location of central device 104. Furthermore, in additional to GNSS, AP signals, peer signals, or other signals, central device 104 may collect additional sensor data (e.g., imaging, barometric pressure, light sensors, Bluetooth signals, etc.) captured by the connected devices 106 in order to perform a hybrid positioning process that utilizes the additional sensor data to refine and/or otherwise enhance positioning determinations.

Figure 3A:
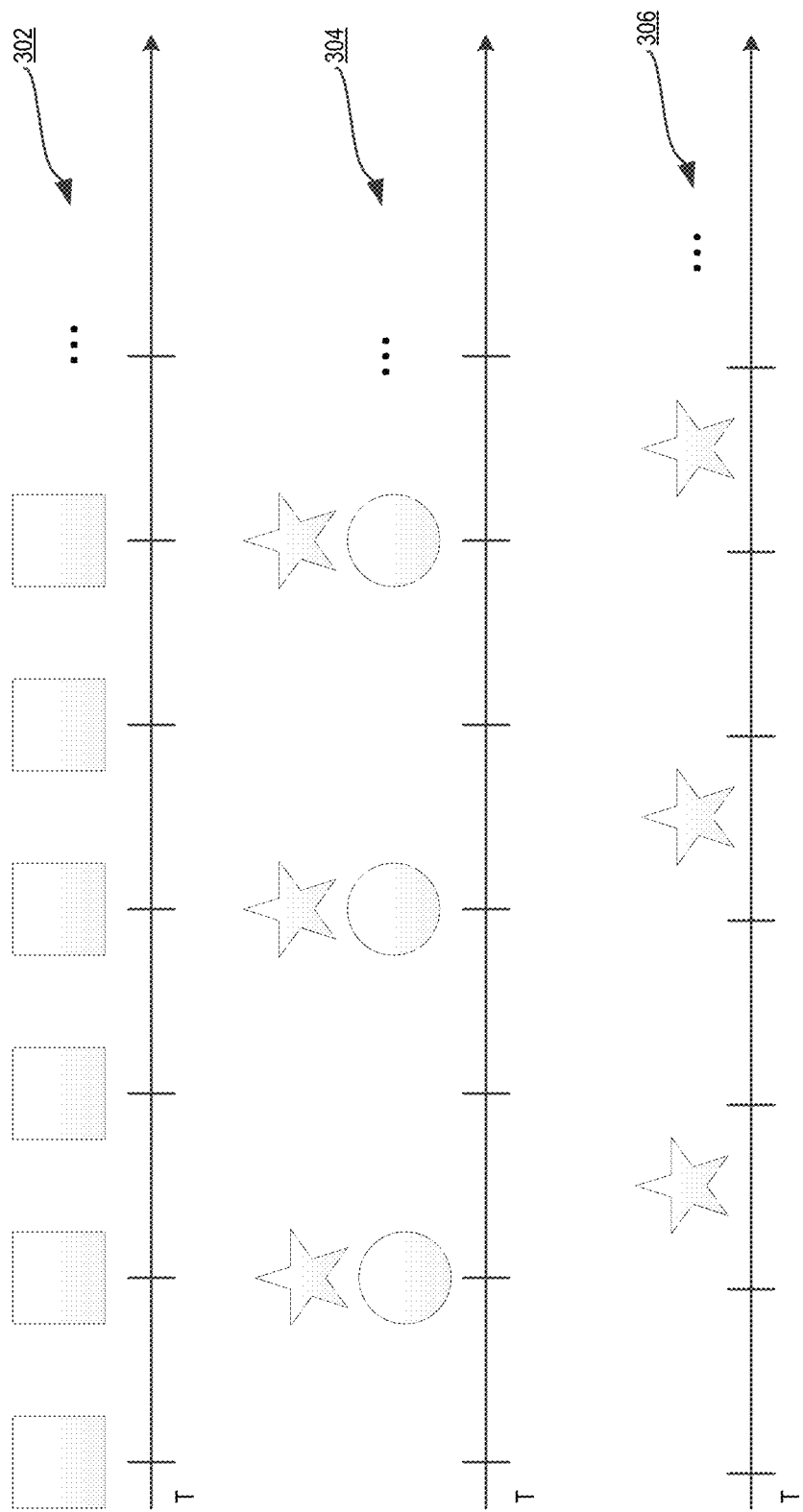
FIG. 3A is a symbolic representation of individual sensing intervals of a central device and two connected devices.

In one embodiment, central device 104 utilizes the collected sensing capabilities of the connected devices to generate a coordinated sensing schedule. In one embodiment, the coordinated sensing schedule is a combined and/or individual sensing schedule of the sensing operations to be performed by the various sensors of central device 104 and the sensors of the connected devices 106 so that a time at which sensor readings from the various sensors are obtained are coordinated. For example, if the central device 104 measures sensor readings for a sensor at a first interval 302, a connected device measures two different sensor readings at a second interval 304, and another connected device measures a sensor reading at an offset of the second interval 306, the sensing intervals and thus the sensor measurements are likely to be temporally misaligned as illustrated in the FIG. 3A. The temporal misalignment of the sensor readings can impact the accuracy and/or usefulness that the sensor readings have with respect to central device's 104 positioning process, and as will be discussed in greater detail below crowdsourced sensor readings. That is, the readings will be most useful for hybrid positioning purposes and/or crowdsourced sensor measurement gathering when captured at the same location. If central device 104 is moving (e.g., a user is driving, running, cycling, walking, etc.), the temporal misalignment of the measurements illustrated in FIG. 3A will cause the different sensor measurements to be gathered at potentially vastly different real-world locations. Thus, potentially large inaccuracies will result when central device 104 uses the temporally misaligned sensor measurements when performing positioning.

Figure 3B:
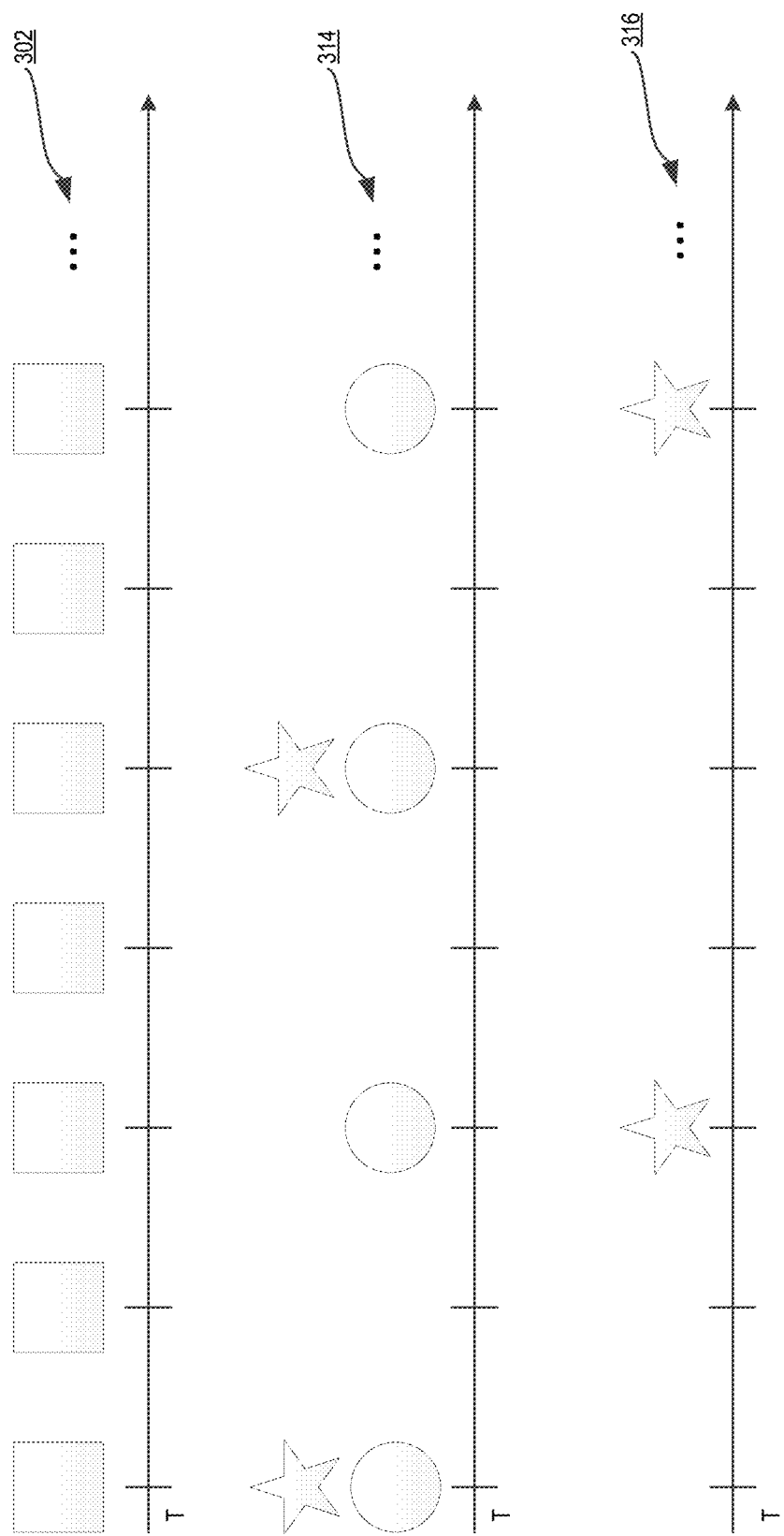
FIG. 3B is a symbolic representation of scheduled sensing intervals of a central device and two connected devices.

In one embodiment, the central device 104 having collected the sensor capabilities (e.g., sensor types, measurement frequencies, etc.) performs a scheduling operation to align sensing operations that will be performed by the central device 104 and the one or more connected devices 106. In one embodiment, the alignment includes establishing a start time and interval of the sensing operations performed by each connected device 106. For example, central device 104 can perform scheduling that temporally aligns start times of the sensor measurements collected by each connected device 106 and sensor measurements collected by the central device 104, changes the interval for overlapping sensor reading types (e.g., to avoid duplicate measurements), turns off certain sensors from taking measurements based on one or more device conditions (e.g., battery low), adjusts intervals and/or connected device scanning duties based on devices being added or removed from the connected devices, as well as other adaptive sensor scheduling operations. One embodiment of a revised (e.g., aligned and redundancy removed) sensing schedule as imparted by central device 104 at each individual connected devices 106 is illustrated in FIG. 3B. The resulting combined sensor data collected by the central device 104 (e.g., the sensor measurements captured by connected devices 106 and central device 104) would thus capture temporally aligned and redundancy removed sensor measurements as illustrated in FIG. 3C.

In embodiments, the sensing operations performed by the sensors at each device (e.g., the connected devices 106 and the central device 104) can be more closely time aligned to ensure the relevancy of each sensor when performing the positioning process. That is, even when a user of the central device 104 and the connected devices 106 is moving (e.g., user is walking, running, driving, etc.), the temporal alignment of when sensor measurements are taken ensures that the various measurements are taken at the same physical location. Furthermore, in embodiments, measurements taken by duplicate sensor types (e.g., duplicate measurement types in 304 and 306) can be eliminated by central device 104 to turn off, stagger, or otherwise reduce the redundant sensing (e.g., 314 and 316) to save power and/or computational resources at one or more of the connected devices 106.

In one embodiment, redundant sensor types can also be used to increase a resolution (or scanning frequency) of that sensor type without increasing overall power consumption of the central device 104 and connected devices 106. That is, a higher scanning rate can be achieved by staggering sensor operations performed by the same type of sensor without requiring either connected device to perform additional sensing operations (e.g., connected devices scan at lower rates to minimize power consumption, while the global scanning result is the faster rate attributable to the temporally staggered scanning of sensors of the same type). For example, otherwise redundant readings (e.g., as illustrated by sensor measurements 304 and 306) can be staggered by central device 104 when scheduling the sensing operations (temporally aligned, temporally staggered, and without removing redundancies) at the connected devices 106 to increase sensing rate to meet a positioning or other requirement as illustrated in FIG. 3D. Furthermore, sensors that are not scheduled at the same interval (e.g., one sensor operates at 10 second intervals and one operates at 20 second intervals) can be time aligned by scheduling the overlap of their least common interval.

In embodiments, other scheduling operations may also be performed by central device 104. For example, if a desired sensing interval is 10 seconds, a first connected device 106-1 can perform periodic sensing operations within the range of 5-100 seconds, and a second connected device 106-2 can perform periodic sensing operations within the range of 1-20 seconds, then central device can distribute a schedule to the connected devices that causes periodic sensing at the desired interval. However, if a desired sensing interval is 10 seconds, a first connected device 106-1 can perform periodic sensing operations within the range of 5-100 seconds, and a second connected device 106-2 can perform periodic sensing operations within the range of 12-20 seconds, then central device can distribute a schedule to the connected devices that causes periodic sensing according to a schedule closest to the desired schedule, such as periodic scanning every 12 seconds.

In the embodiments discussed above, the scheduling provided by central device 104 and utilized by connected devices 106 when performing their respective sensing results in a near-zero latency between sensor measurements collected by different devices. Thus, the time aligned and coordinated sensor measurements minimize position error when central device 104 performs positioning using these measurements, and as discussed below, when a crowdsourcing server 108 utilizes the collected sensor measurements.

In one embodiment, the coordinated sensor readings collected by central device 104 are provided, by central device 104, to crowdsourcing server 108. In one embodiment, central device 104 and crowdsourcing server 108 are communicably coupled via network 104 (e.g., the Internet, a WAN, a LAN, or a combination of different networks) and utilize any of the standard protocols for exchanging communications. In one embodiment, crowdsourcing server 108 utilizes the sensor measurements collected by central device 104 to generate positioning assistance data based on the sensor readings and the central device's 104 location when the readings were obtained. Because the various sensor readings are temporally aligned, and thus physical position of the sensors is the same, the sensor readings are much more valuable to crowdsourcing server 108 in terms of accuracy and reliability. For example, AP signal measurements collected by one or more connected devices 106 can be corroborated by GNSS measurements and/or positioning determinations made by central device 104. As another example, an AP based positioning determination made by central device 104 can be associated with barometric pressure measurements made by connected devices to refine an altitude associated with the corresponding AP signal measurements.

In embodiments, sensor readings may be collected by central device 104 and connected devices 106 for the purpose of performing crowdsourcing of sensor measurements. In embodiments, the combined sensor data may be explicitly turned on by the user to imitate data collection. In other embodiments, the combined sensor data may periodically be collected by central device 104 and transmitted to crowdsourcing server 108 in response to a user request made to central device 104. In either embodiment, the combined sensor measurements are collected and communicated to crowdsourcing server 108. When sensor readings are automatically collected for crowdsourcing purposes (e.g., periodically as specified by a user), lower power sensors (e.g., barometric, light, image, etc.) of the connected devices 106 may be rescheduled to align to the high powered sensing (e.g., GNSS) performed by central device 104. Similarly, for on-demand crowdsource sensor measurement collection at central device 104, high powered sensing (e.g., GNSS) can be scheduled to align with the lower power sensors of the connected devices 106.

Figure 2:
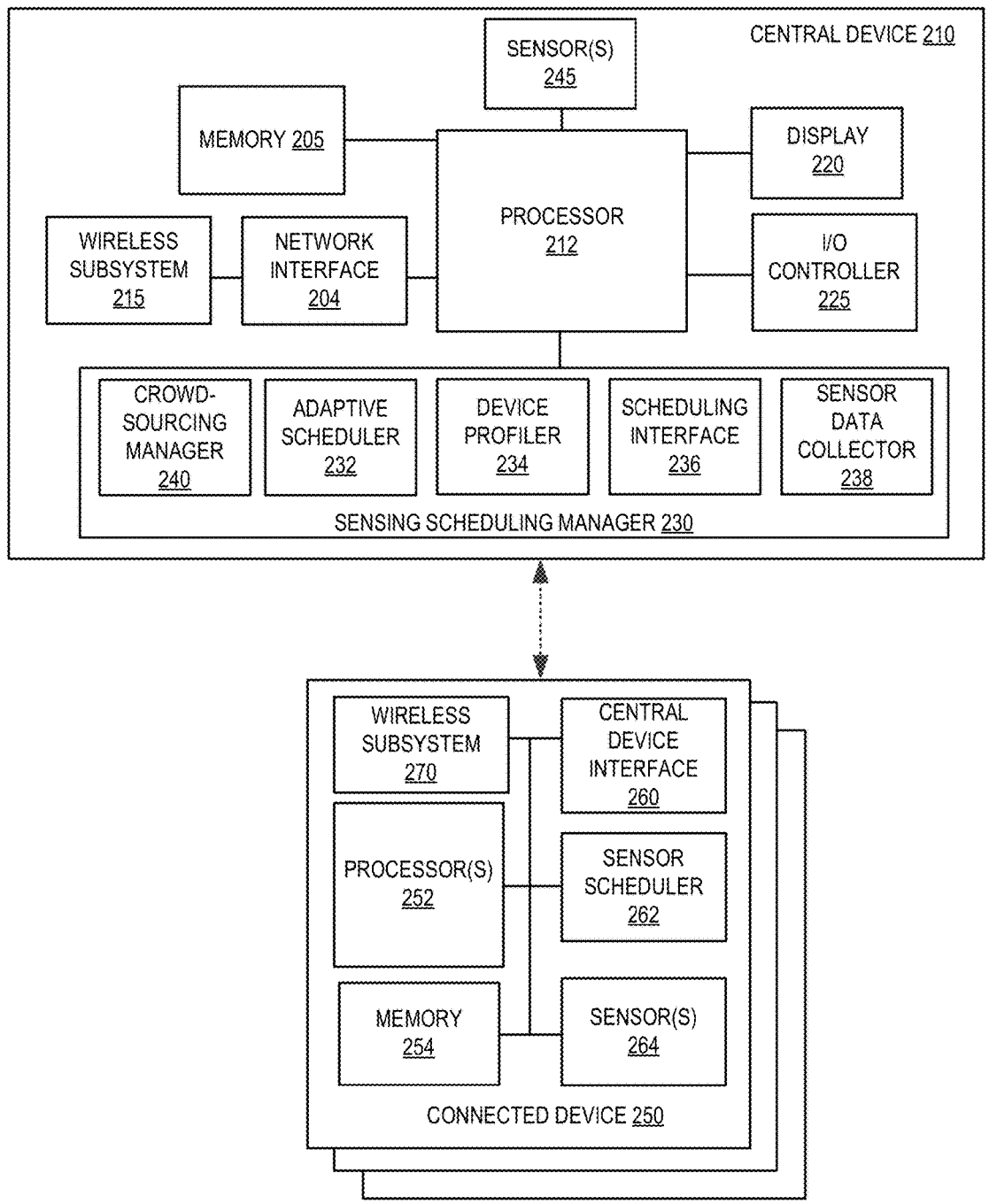
FIG. 2 is block diagram of one embodiment of a central device and a plurality of connected devices.

FIG. 2 is block diagram of one embodiment 200 of central device 210 and one or more connected devices, including connected device 250. In one embodiment, the central device 210 and connected device 250 provide additional details for the user equipment and wearable device discussed above in FIG. 1.

In one embodiment, central device 210 is a system such as a mobile telephone, tablet computer, wearable device, controller in a motor vehicle, smart home controller, access point (e.g., a portable or stationary access point), or other type of computing device that would typically be proximately located or collocated with the connected device, and capable of performing the operations discussed herein. In embodiments, the central device 210 may include one or more processors 212, a memory 205, a display 220, an input/output controller 225, a network interface 204, and one or more sensor(s) 245 (e.g., GNSS, AP, barometric, temperature, light, imaging, etc. sensors). Central device 210 may also include a number of processing modules, which may be implemented as hardware, software, firmware, or a combination, such as the sensing scheduling manager 230 including adaptive scheduler 232, device profiler 234, scheduling interface 236, sensor data collector 238 and crowdsourcing manager 240. It should be appreciated that central device 210 may also include, although not illustrated, a user interface (e.g., keyboard, touch-screen, or similar devices), a power device (e.g., a battery), as well as other components typically associated with electronic devices. Network interface 204 may also be coupled to a number of wireless subsystems 215 (e.g., Bluetooth, WLAN, WiFi, Cellular, or other networks) to transmit and receive data streams through a wireless link. In one embodiment, wireless subsystem 215 communicatively couples central device 210 to a crowdsourcing server (e.g. crowdsourcing server 108 of FIG. 1).

In one embodiment, connected device 250 is also a system, which may include one or more processor(s) 252, a memory 254, one or more sensor(s) 264 (e.g., barometric sensors, AP signal sensors, GNSS signal sensors, light sensors, temperature sensors, imaging sensors, accelerometers, gyroscopes, etc.), and a wireless subsystem, such as central device interface 260. Connected device 250 may also include a number of processing modules, which may be implemented as hardware, software, firmware, or a combination, such as sensor scheduler 262. It should be appreciated that connected device 250 may also include, although not illustrated, a user interface (e.g., keyboard, touch-screen, or similar devices), a power device (e.g., a battery), a display screen (e.g., an LCD display), as well as other components typically associated different types of connected devices (e.g., wearable devices, fitness trackers, gaming systems, health monitoring devices, etc.). Central device interface 260 (e.g., a Bluetooth, WiFi, WLAN, Cellular, or other communication interface) of connected device 250 utilizes a transceiver of wireless subsystem 270 to transmit and receive data, such as sensor measurement data, through a wireless link to/from central device 210.

In one embodiment, one or both of memory 205 and memory 254 may be coupled to a processor to store instructions for execution by the processors, such as processor(s) 212 and processor(s) 252. In some embodiments, memory 205 and memory 254 are non-transitory. Memory 205 and memory 254 may store one or more modules processing modules to implement embodiments described herein. It should be appreciated that the embodiments as will be hereinafter described may be implemented through the execution of instructions, for example as stored in memory or other element, by processor(s) 212 of central device 210, and/or other circuitry of central device 210, by processor(s) 252 of connected device 250, and/or other devices. Particularly, circuitry of central device 210 and connected device 250, including but not limited to processor(s) 212 and processor(s) 252, may operate under the control of a program, routine, or the execution of instructions to execute methods or processes in accordance with the aspects and features described herein. For example, such a program may be implemented in firmware or software (e.g. stored in memory 205 and/or memory 254) and may be implemented by processors, such as processor(s) 212 and/or processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, communication subsystems of central device 210 and connected device 250 establish a communication link (e.g., a wireless personal area network connection, a wireless local area network connection, a combination of networks, etc.) with one another. In one embodiment, during the establishment of the communications link, scheduling interface 236 of sensing scheduling manager 230 requests sensing capabilities from central device interface 260 as part of the networking handshaking and authentication process. In another embodiment, the sensing capabilities may also be gathered by scheduling interface 236 at any time, such as after the communication link is established between central device 210 and connected device 250. In either embodiment, sensor scheduler 262 of connected device 250 responds to the request with data indicative of the types of sensor(s) 264 that are available at connected device, a sensor measurement schedule for each of sensor(s) 264, what sensing parameters are configurable (e.g., whether sensor scheduling start times, frequency, usage, etc. can be adjusted), as well as other sensing capabilities. Device profiler 234 then stores a device specific sensing profile based on the sensing capabilities of connected device 250 in memory 205.

In one embodiment, adaptive scheduler 232 accesses the device specific sensing profile to generate a sensing schedule for connected device 250. As discussed herein, central device 210 may be communicably coupled with a plurality of different connected devices having a plurality of different and overlapping sensor types. Thus, adaptive scheduler 232 accesses all of the profiles of the connected devices, including the sensing profile of connected device 250 and central device 210, to determine what sensors are available, what are the sensing start times for each sensor, what are the sensing intervals for each sensor, as well as other sensing capabilities.

Adaptive schedule 232 utilizes this collected sensing capabilities data (e.g. the combined sensing capabilities of central device 210 and connected devices) to generate a schedule that coordinates the sensing performed by the connected devices and the central device. As discussed herein, the coordinated sensing schedule temporally aligns the start time of sensing operations performed by different sensors (e.g., FIG. 3C), removes redundancy in sensing where multiple devices have the same sensor type, increases sensing resolution by staggering sensor measurements of the same type performed by different devices (e.g., FIG. 3D), as well as other sensing scheduling operations.

The schedule is then distributed to the sensor schedulers of each connected device, including sensor scheduler 262 of connected device 250. In embodiments, the schedule is a global schedule generated by central device 210 to coordinate the sensing across each connected device when implemented by their respective sensor schedulers. In one embodiment, the same global schedule is distributed to each device. In another embodiment, adaptive scheduler 232 maintains a global schedule, but generates an individual schedule corresponding to each connected device, which when executed by the sensor schedulers of each connected device, achieves the global schedule generated by adaptive scheduler. In embodiments, global schedules may be periodically generated by adaptive scheduler 232 to revise an existing global schedule, or generate a new global schedule, to adapt to various conditions among the central device and one or more connected devices. For example, adaptive scheduler 232 can adapt a global sensor responsive to the addition of one or more new connected device(s), the removal of one or more existing connected device(s), device conditions that effect sensing capabilities (e.g., battery life, hardware failure, etc.), as well as other factors that impact global sensing. The periodically updated and/or generated schedules can be distributed to the connected devices, as discussed herein.

In one embodiment, sensor data collector 238 then collects data generated by the sensing performed by the sensors of the connected devices, including the sensor measurements generated by sensor(s) 264 of connected device. The collected sensor measurements, which are at least temporally aligned, are then stored in memory 205 as a collected group of sensor measurements. In one embodiment, central device 210 may use the collected/temporally aligned sensor measurements when performing a hybrid positioning process (e.g., a positioning process that utilizes the sensor readings to improve startup time of the process, improve accuracy of positing result obtained by the process, improve speed by which the process is performed, etc.).

In one embodiment, sensor data collector 238 and adaptive scheduler 232 may further adjust sensing scheduling for crowdsourcing sensor data collection. In one embodiment, sensor readings can be collected for crowdsourcing purposes on-demand (e.g., in response to a user request) or periodically (e.g., as configured and by permission of a user). In either embodiment, collected sensor measurements are provided by central device 210 to a crowdsourcing server (not shown) along with a location determination associated the collected sensor measurements. In one embodiment, the collected sensor measurements may be those collected according to the global schedule distributed by adaptive scheduler, and associated with an a crowdsourcing interval (e.g., sensor measurements are collected at interval i, and crowdsourcing data is provided every n intervals). However, in response to an on-demand request to collect sensor readings for crowdsourcing measurements, adaptive scheduler 232 delays the positioning determination (e.g. a high powered sensor operation) until an opportunistic future sensing interval. In one embodiment, the opportunistic future sensing interval can be an interval in which sensing, including GNSS, AP, or other high powered sensing, is already scheduled to occur. In another embodiment, the opportunistic future sensing interval can be an interval in which sensing is already scheduled to occur, but high powered GNSS, AP, or other sensing is not scheduled to occur, and instead the high powered sensing is triggered on an on-demand basis. In either embodiment, the positioning determination and associated collected and temporally aligned sensor measurements are stored in memory 205.

In one embodiment, crowdsourcing manager 240 accesses the collected/temporally aligned sensor measurements and communicates the measurements to a crowdsourcing server (not shown). The crowdsourcing server could then use the collected/temporally aligned sensor measurements when performing various crowdsourcing processes, such as AP fingerprinting, indoor map generation, WWAN cell localization, indoor visual feature localization, building floor determination, etc. Furthermore, because the collected sensor measurements are temporally aligned, the sensor measurements are much more valuable to the crowdsourcing server due to their increased accuracy. That is, for example, AP signal strength measurements associated and temporally aligned with a GNSS positioning determination and a barometric sensor measurement are more valuable when generating an indoor map by crowdsourcing server. As another example, imaging sensor data associated with positioning data would enable crowdsourcing server to supplement location determination services based on the imaging data (alone).

Figure 4:
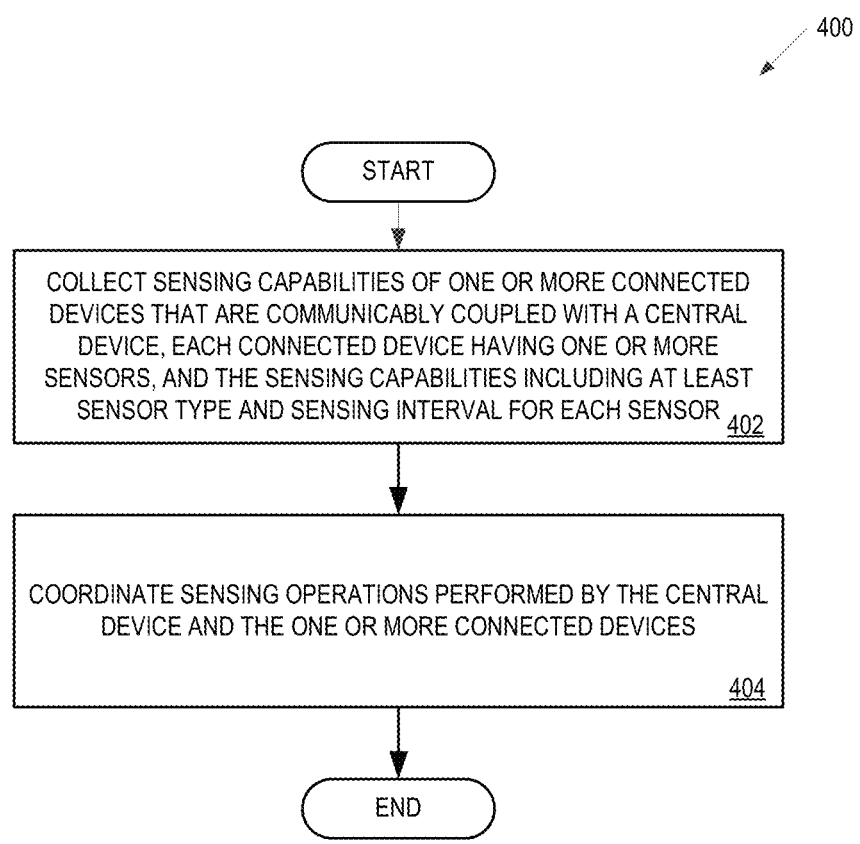
FIG. 4 is a flow diagram of an embodiment of a method for utilizing a central device to coordinate sensing operations performed by a plurality of connected devices.

FIG. 4 is a flow diagram of an embodiment of a method for utilizing a central device to coordinate sensing operations performed by a plurality of connected devices The method 400 is performed by processing logic that may comprise hardware (circuitry, dedicated logic, etc.), software (such as is run on a general purpose computer system or a dedicated machine), firmware, or a combination. In one embodiment, the method 400 is performed by a device (e.g., central device 104 or 210).

Referring to FIG. 4, processing logic begins by collecting sensing capabilities of one or more connected devices that are communicably coupled with a central device (processing block 402). In embodiments, the central device may be a mobile device, such as a smartphone, and each of the connected devices may also be a mobile device, such as wearable devices, smart garments, medical device, gaming devices, etc. In embodiments, the central device may also be other types of devices, such as a controller system in a mobile vehicle, an access point, a laptop computer, a desktop computer, or another device capable of performing the operations discussed herein. In embodiments, the sensing capabilities collected by processing logic can include at least sensor types of the sensors of the connected devices (e.g., whether a connected device has an image sensor, barometric sensor, network transceiver, etc.), as well as sensing intervals for each of the sensors of the connected devices.

Processing logic then coordinates sensing operations performed by the central device and the one or more connected devices (processing block 404). In embodiments, the coordination temporally aligns the sensing operations of the central device, one or more connected devices, or a combination thereof. As discussed above, with respect to FIGS. 3B-3D, by temporally aligning sensing operations, processing logic ensures that the sensor measurements obtained by the sensing operations of each device are obtained at the same location, avoids redundant sensor operations, offsets redundant sensor operations to increase overall sensor scan rates, etc. As discussed herein, the coordinated sensor operations obtain aligned data (e.g. obtained from the same physical location) that will improve a positioning processes (e.g., hybrid positioning) that utilizes the coordinated sensor operation data. Furthermore, the coordinated sensor measurements are valuable to a crowdsourcing system. In embodiments, each type of sensor data is associated with the same location, which provides the crowdsourcing system with multiple related information sources when generating improved assistance data from the coordinated sensor measurements.

Figure 5A:
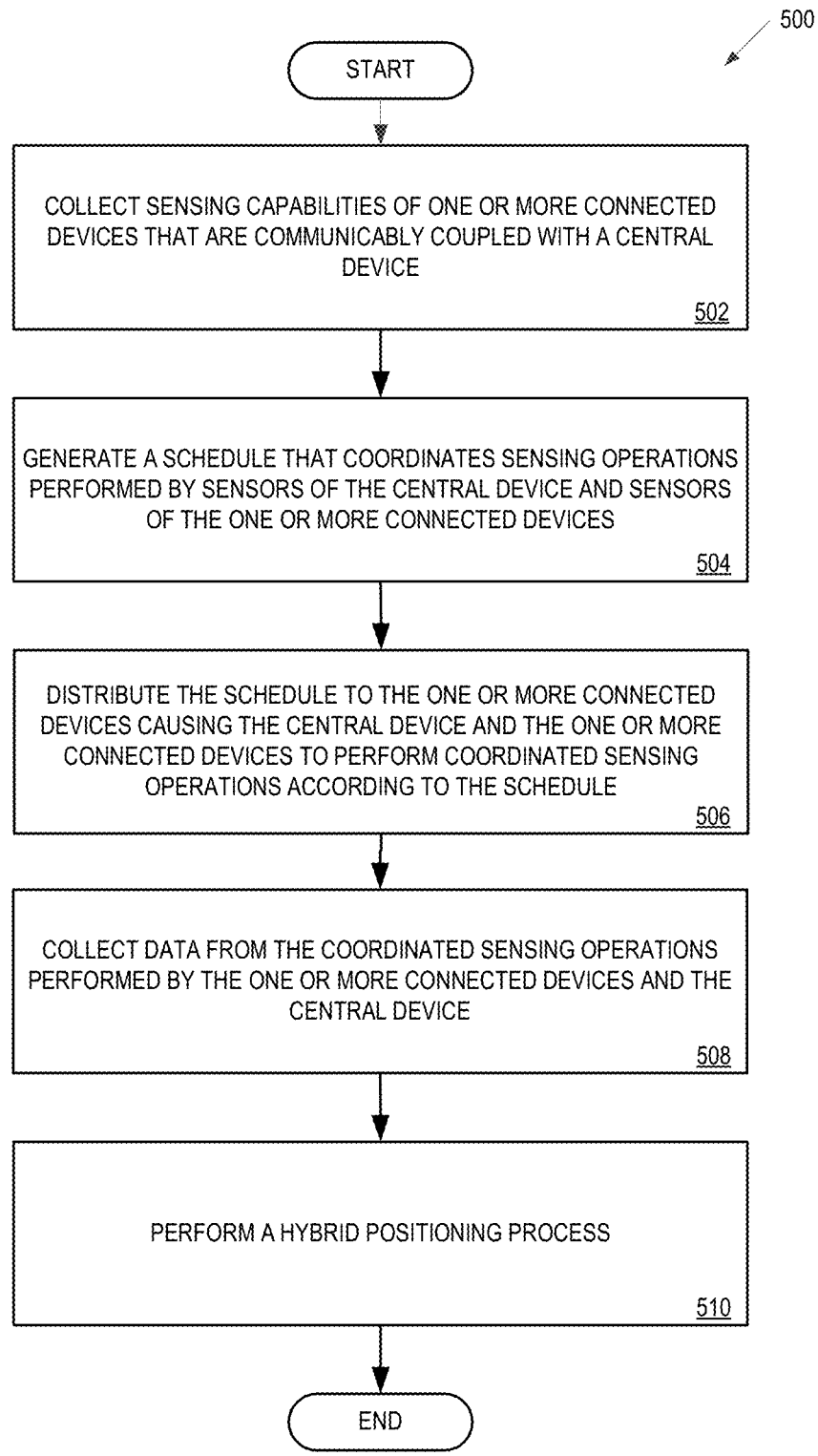
FIG. 5A is a flow diagram of an embodiment of another method for utilizing a central device to manage sensing operations performed by a plurality of connected devices.

FIG. 5A is a flow diagram of an embodiment of another method 500 for utilizing a central device to manage sensing operations performed by a plurality of connected devices. The method 500 is performed by processing logic that may comprise hardware (circuitry, dedicated logic, etc.), software (such as is run on a general purpose computer system or a dedicated machine), firmware, or a combination. In one embodiment, the method 500 is performed by a device (e.g., central device 104 or 210).

Referring to FIG. 5A, processing logic begins by collecting sensing capabilities of one or more connected devices that are communicably coupled with a central device (processing block 502). Processing logic then generates a schedule that coordinates sensing operations performed by sensors of the central device and sensors of the one or more connected devices (processing block 504). As discussed above the schedule is a global schedule that coordinates that start times and sensing intervals of various sensors across each of the devices. Because the schedule is a global schedule and the sensing capabilities of each device are known to processing logic, redundant sensing operations (e.g., sensor measurements of the same type taken at the same interval) can be eliminated. Similarly, sensing operations of the same type at different devices can be staggered at different intervals to obtain a higher sensing resolution (e.g., sensing performed at a higher frequency) without increasing the sensing frequency of any individual device. Other scheduling operations, as discussed herein, may also be performed by processing logic.

Processing logic then distributes the schedule to the one or more connected devices causing the central device and the one or more connected devices to perform coordinated sensing operations according to the schedule (processing block 506). After the sensing is performed, processing logic collects data from the coordinated sensing operations performed by the one or more connected devices and the central device (processing block 508). In one embodiment, processing logic utilizes the collected sensor measurements to perform a positioning process (processing block 510), such as a hybrid positioning process using data collected from different sensing operations. For example, processing logic may utilize barometric pressure measurements when performing AP based positioning, use GNSS positioning with AP signal measurements to increase speed of a positioning determination, utilize WiFi signals during pedestrian dead reckoning to refine a position or increase time to position fix, utilizing WiFi, Bluetooth, or a combination of wireless signals during vision based positioning, while performing simultaneous localization and mapping using another positioning method (e.g., Wifi based, BlueTooth based, PDR based, etc.), as well as other positioning processes that utilize data collected from different types of sensors.

Figure 5B:
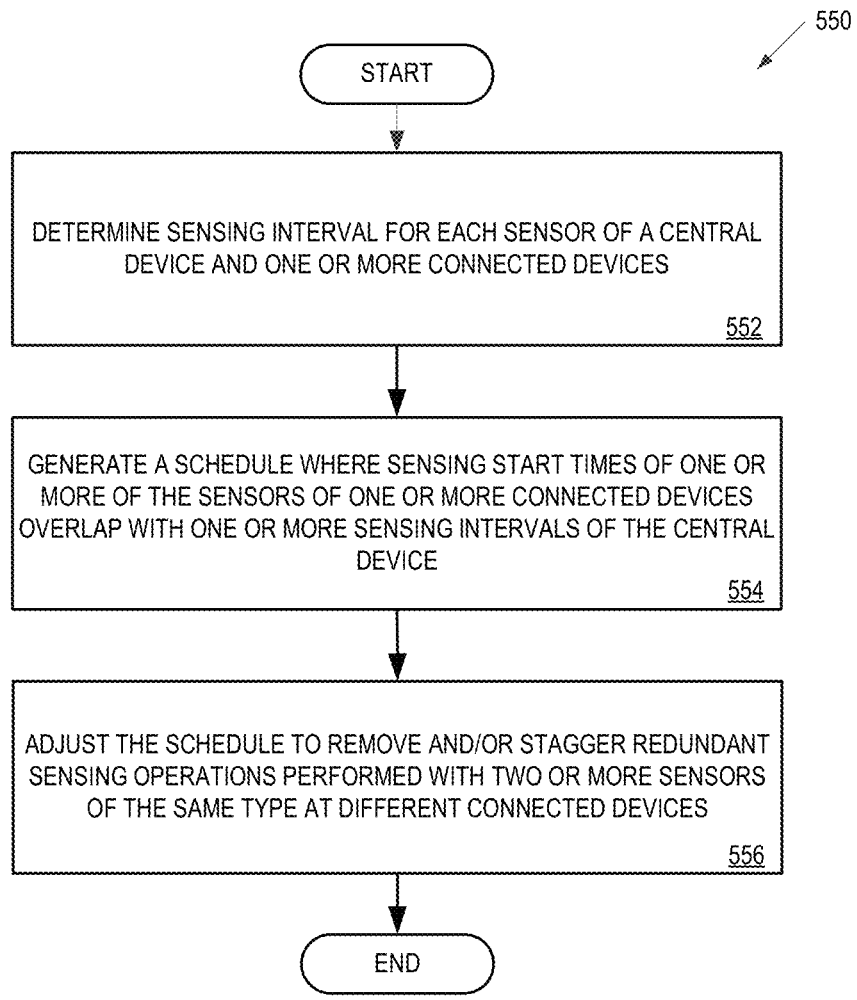
FIG. 5B is a flow diagram of an embodiment of a method for generating a schedule for coordinating sensing operations between a central device and connected devices.

FIG. 5B is a flow diagram of an embodiment of a method 550 for generating a schedule for coordinating sensing operations between a central device and connected devices. The method 550 is performed by processing logic that may comprise hardware (circuitry, dedicated logic, etc.), software (such as is run on a general purpose computer system or a dedicated machine), firmware, or a combination. In one embodiment, the method 550 is performed by a device (e.g., central device 104 or 210).

Referring to FIG. 5B, processing logic begins by determining sensing intervals for sensors of a central device and one or more connected devices (processing block 552). In one embodiment, the sensor types and sensing intervals at each device may be available to processing logic based on data exchanged during a network operation performed between central device and each of the connected devices. In another embodiment, the central device may request such information from each connected device. Furthermore, additional sensing capabilities, such as the ability to adjust whether a sensor collects measurements or can be turned off, adjusting a sensing frequency, as well as other sensing capabilities may also be determined by processing logic.

Processing logic generates a schedule where sensing start times of one or more of the sensors of one or more connected devices overlap with one or more sensing intervals of the central device (processing block 554). Furthermore, processing logic adjusts the schedule to remove and/or stagger redundant sensing operations performed with two or more sensors of the same type at different connected devices (processing block 556). In one embodiment, the sensing start times of the sensors of the connected devices are temporally aligned with a sensing start time of a sensing interval of central device (e.g., FIG. 3B). Furthermore, sensing start times of individual sensors at different devices may be adjusted by, for example, scheduling an offset start time to avoid redundant sensing and increase sensing resolution across different devices (e.g., FIG. 3D), disable sensing to avoid redundant sensing across different devices (e.g., FIG. 3C), as well as other scheduling configurations generated for sensing start times across the different devices/sensors. In the embodiments, by removing redundant sensing and/or increasing sensing resolution for a specific sensor type without increasing scanning frequency across any of the devices, power consumption and sensor usage are made more efficient across the central and connected devices.

Figure 6:
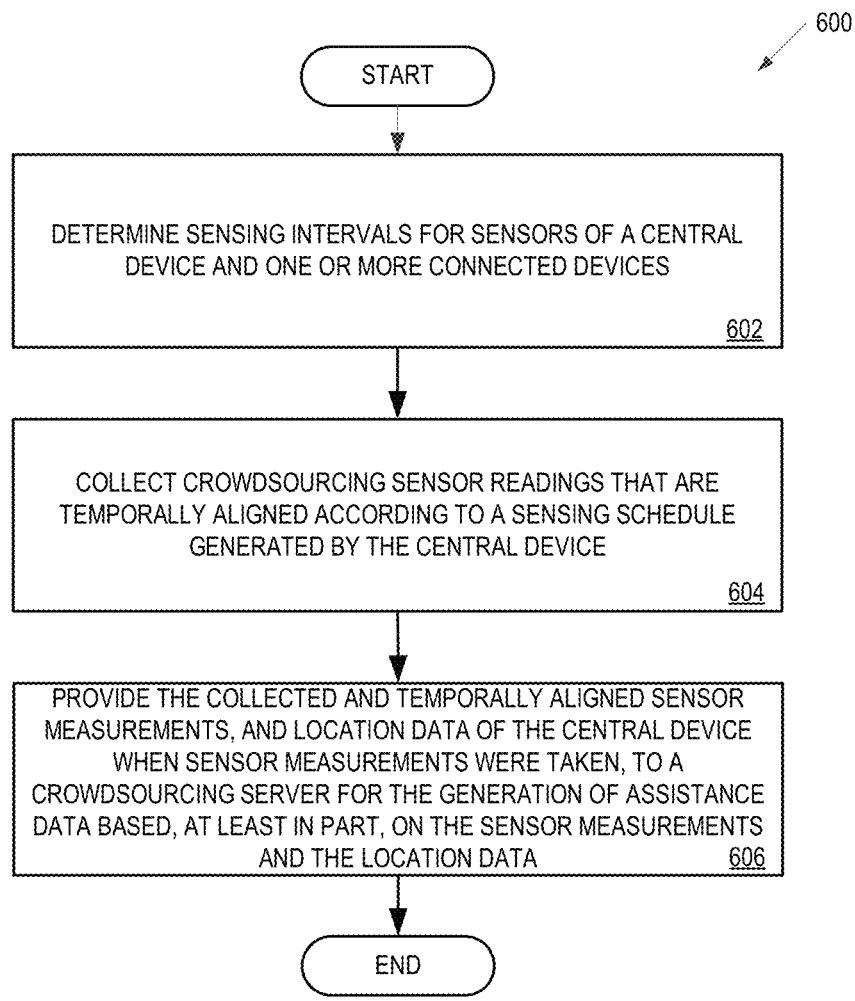
FIG. 6 is a flow diagram of an embodiment of a method for utilizing a central device to collect coordinated sensing data for use by a crowdsourcing server.

FIG. 6 is a flow diagram of an embodiment of a method 600 for utilizing a central device to collect coordinated sensing data for use by a crowdsourcing server. The method 600 is performed by processing logic that may comprise hardware (circuitry, dedicated logic, etc.), software (such as is run on a general purpose computer system or a dedicated machine), firmware, or a combination. In one embodiment, the method 600 is performed by a mobile device (e.g., central device 104 or 210).

Referring to FIG. 6, processing logic begins by determining sensor intervals for sensors of a central device and one or more connected device (processing block 602). In one embodiment, the sensor intervals are determined in response to crowdsourcing sensor data gathering (e.g., as part of a scheduled/regular crowdsourced data gathering operation) or in response to an on-demand request of a user (e.g., a user command to transmit sensor readings to a crowdsourcing server).

Processing logic collects crowdsourcing sensor readings that are temporally aligned according to a sensing schedule generated by the central device (processing block 604). As discussed herein the temporally aligned sensor readings may include the measurements taken by sensors associated with the crowdsourcing operation (e.g., sensors of specific types), and collected from various connected devices that performed the measurements. In one embodiment, the collection is performed on a fixed/configured interval (e.g., as set by a user or crowdsourcing application), or in response to a use command (e.g., an on demand sensor data collection). In one embodiment, for on-demand sensor measurement data collection, processing logic will delay one or more sensor measurements from occurring until a selected future interval of a distributed schedule. For example, a high powered GNSS sensing operation is delayed until a next appropriate sensing interval utilizing the sensor types needed for the crowdsourcing data gathering.

Processing logic then provides the collected and temporally aligned sensor measurements, and location data of the central device when sensor measurements were taken, to a crowdsourcing server (processing block 606). In embodiments discussed herein, the collected and temporally aligned sensor measurements are provided to the crowdsourcing server for the generation of assistance data based, at least in part, on the sensor measurements and the location data. Because the collected sensor measurements are temporally aligned with one another, they are more valuable to the crowdsourcing server since their various measurements can be associated with one another data (e.g., a barometric pressure measurement can be associated with a GNSS based location determination, AP signal strength measurements can be associated with a GNSS based location determination, an AP based location determination can be associated with imaging information, etc.). Furthermore, the various types of temporally associated sensor data enables generation of more accurate and more comprehensive assistance data.

It should be appreciated that when the devices discussed herein include mobile devices (e.g., central device and connected device(s)), that the mobile devices may communicate via one or more wireless communication links through a wireless network that are based on or otherwise support any suitable wireless communication technology. For example, in some aspects the mobile devices may associate with a network including a wireless network. In some aspects the wireless connections discussed herein form networks, which may comprise a body area network, a personal area network (e.g., an ultra-wideband network), a wireless local area network, as well as other types and/or combinations of networks. In some aspects the network may comprise a local area network or a wide area network. A wireless device may support or otherwise use one or more of a variety of wireless communication technologies, protocols, or standards such as, for example, CDMA, GSM, WCDMA, LTE, TD-SCDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, wearable devices, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a fitness device (e.g., a biometric sensor, a pedometer, etc.), a wearable device (e.g., a smartwatch), a smart system (e.g., a smart appliance, a smart automobile, a smart robot, or other smart device), or any other suitable device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

Figure 7:
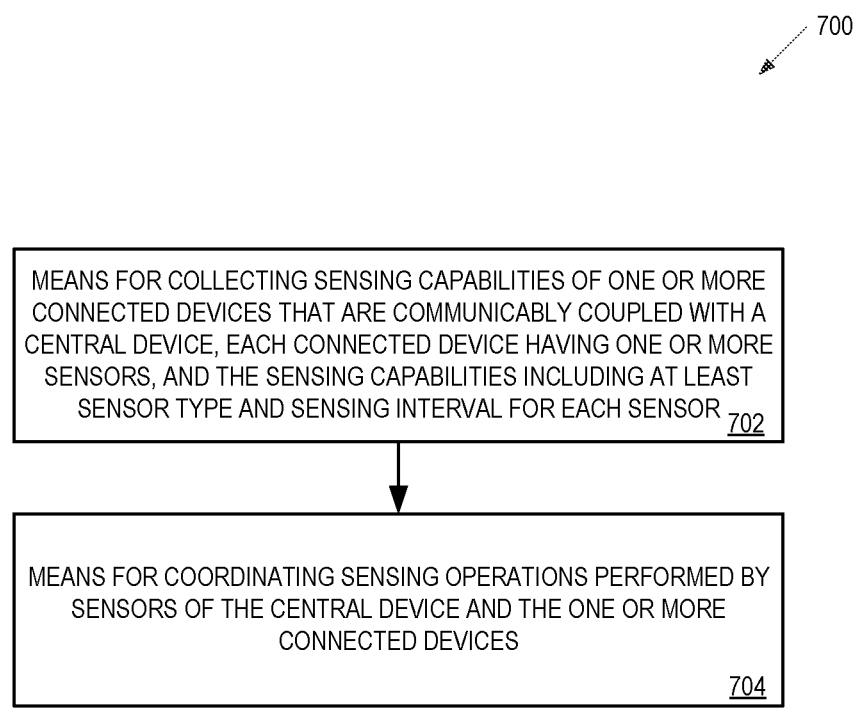
FIG. 7 is a block diagram of an embodiment of a system 700.

An additional embodiment of the principles disclosed herein is a system 700 as depicted in FIG. 7 that includes means 702 for collecting sensing capabilities of one or more connected devices that are communicably coupled with a central device, wherein each connected device has one or more sensors, and wherein the sensing capabilities comprise at least sensor type and sensing interval for each sensor. System 700 also includes means 704 for coordinating sensing operations performed by the central device and the one or more connected devices.

In one embodiment of such a system, the system is the central device, which comprises a smartphone, a controller of a motor vehicle, an access point, or a home controller, and the one or more connected devices comprise one or more of a smart watch, fitness tracker, smart glasses, smart garment, medical device, gaming device, or a combination thereof. In this embodiment, the central device is communicatively coupled with the one or more connected devices over a personal area network, a wireless local area network, or a combination thereof. In another embodiment 800 as depicted in FIG. 8, the means for coordinating sensing operations includes means 804 for generating a schedule that coordinates sensing performed by sensors of the central device and the one or more connected devices; and means 806 for distributing the schedule to the one or more connected devices causing the central device and the one or more connected devices to perform coordinated sensing according to the schedule.

Figure 8:
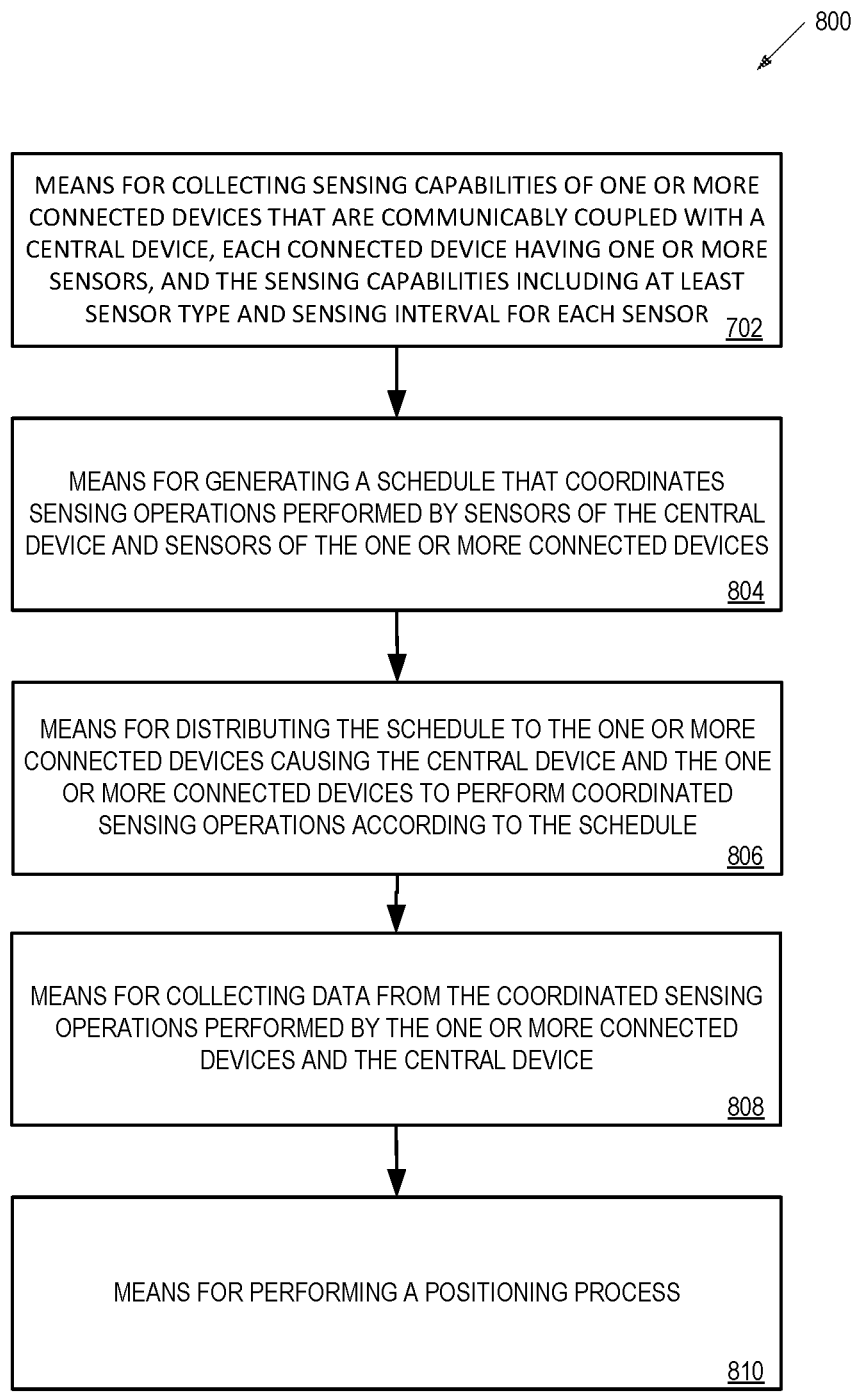
FIG. 8 is a block diagram of an embodiment 800 of system 700.
Figure 9:
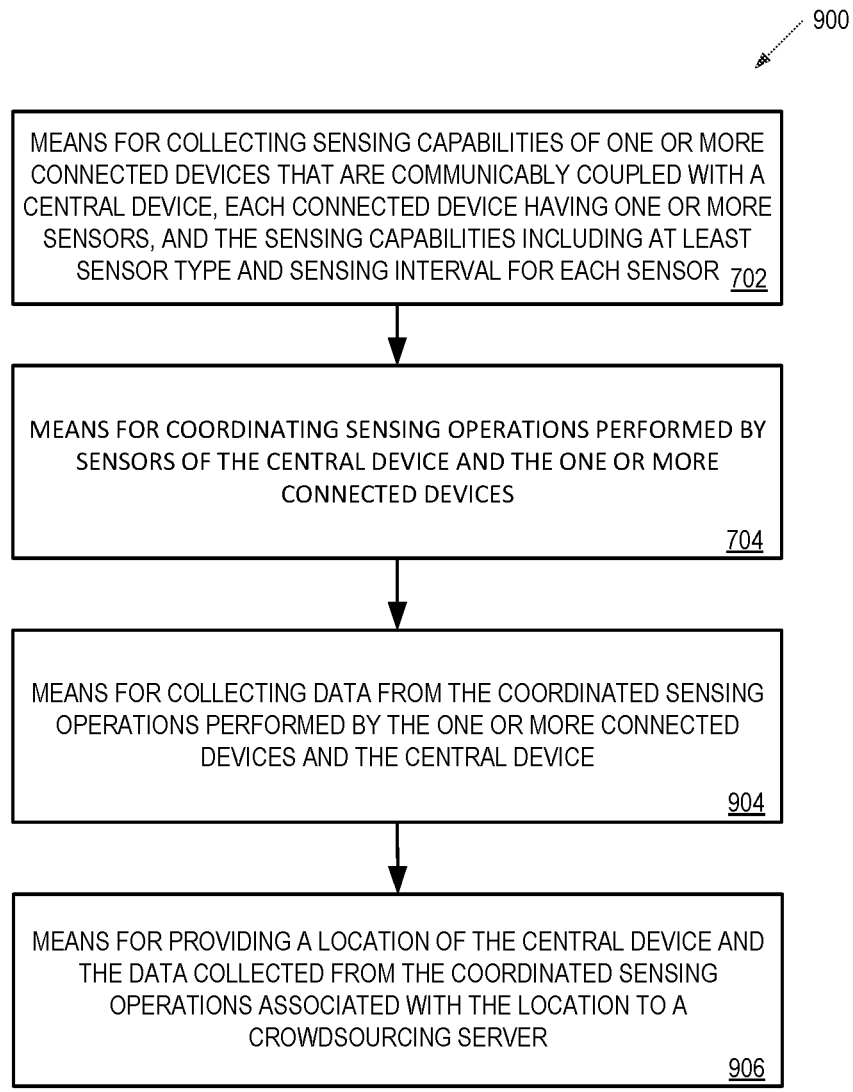
FIG. 9 is a block diagram of an embodiment 900 of system 700.

A further embodiment of the system as also depicted in FIG. 8 includes means 808 for collecting data from the coordinated sensing operations performed by the one or more connected devices and the central device; and means 810 for performing a positioning process (e.g., a hybrid positioning process) by the central device based, at least in part, on the data collected from the coordinated sensing. An even further embodiment 900 as depicted in FIG. 9 includes means 904 for collecting data from the coordinated sensing operations performed by the one or more connected devices and the central device; and means 906 for providing a location of the central device and the data collected from the coordinated sensing operations associated with the location to a crowdsourcing server.

The previous description is provided so that any person skilled in the art can make or use the embodiments described herein. Various modifications to these embodiments will be readily apparent to those skilled in the art, and the generic principles defined herein may be applied to other embodiments without departing from the spirit or scope of the described embodiments. Thus, the aspects and features described herein are not intended to be limited, but are to be accorded the widest scope consistent with the principles and novel features disclosed herein.

What is claimed is:

1. A method for synchronization of sensing operations performed by a plurality of devices, the method comprising:
   collecting, by a central device, sensing capabilities of one or more connected devices that are communicably coupled with the central device, wherein each connected device has one or more sensors, and wherein the sensing capabilities comprise at least sensor type and sensing interval for each sensor; and
   coordinating, by the central device, sensing operations performed by sensors of the central device and the one or more connected devices.

2. The method of claim 1, wherein coordinating sensing operations further comprises:
   generating a schedule that coordinates sensing operations performed by sensors of the central device and the one or more connected devices; and
   distributing the schedule to the one or more connected devices causing the central device and the one or more connected devices to perform coordinated sensing operations according to the schedule.

3. The method of claim 1, wherein coordinating sensing operations performed by sensors of the central device and the one or more connected devices comprises, based at least on the collected sensing intervals, causing one or more sensors of the central device to start data collection at the same time as one or more sensors of the one or more connected devices.

4. The method of claim 1, wherein coordinating sensing operations performed by sensors of the central device and the one or more connected devices comprises, based at least on the collected sensing intervals, causing one or more sensors of the central device to perform data collection at intervals that overlap with data collection intervals of one or more sensors of the one or more connected devices.

5. The method of claim 1, wherein coordinating sensing operations performed by sensors of the central device and the one or more connected devices comprises, based at least on the collected sensor types:
   causing each of a plurality of sensors of a same sensor type at different connected devices to start data collection at a different time than others of the plurality of sensors of the same sensor type, and causing each of the plurality of sensors of the same sensor type to perform data collection at intervals which are temporally staggered with respect to data collection performed by others of the plurality of sensors of the same sensor type.

6. The method of claim 1, further comprising:
collecting data from the coordinated sensing operations performed by the one or more connected devices and the central device; and
performing a positioning process by the central device based, at least in part, on the data collected from the coordinated sensing operations.

7. The method of claim 1, further comprising:
collecting data from the coordinated sensing operations performed by the one or more connected devices and the central device; and
providing a location of the central device and the collected data from the coordinated sensing operations associated with the location to a crowdsourcing server.

8. The method of claim 7, wherein the coordinated sensing operations comprises sensing by the one or more connected devices temporally aligned with an interval of crowdsourcing sensing performed by the central device.

9. The method of claim 7, further comprising:
receiving a request to perform on-demand crowdsourcing sensing;
delaying sensing performed by the central device based on sensing intervals of the one or more connected devices; and
initiating sensing operations by the central device with the sensing operations performed by the one or more connected devices.

10. The method of claim 1, wherein the central device is one of a smartphone, a tablet computer, a controller of a motor vehicle, an access point, or a home controller.

11. The method of claim 1, wherein the one or more connected devices comprise one or more of a smart watch, fitness tracker, smart glasses, smart garment, medical device, gaming device, or a combination thereof.

12. The method of claim 1, wherein the central device is communicatively coupled with the one or more connected devices over a personal area network, a wireless local area network, or a combination thereof.

13. An apparatus for synchronization of sensing operations performed by a plurality of devices, the apparatus comprising:
a memory; and
a processor coupled with the memory, wherein the processor configured to:
collect sensing capabilities of one or more connected devices that are communicably coupled with a central device, wherein each connected device has one or more sensors, and wherein the sensing capabilities comprise at least sensor type and sensing interval for each sensor, and
coordinate sensing operations performed by sensors of the central device and the one or more connected devices.

14. The apparatus of claim 13, wherein the processor configured to coordinate sensing operations further comprises the processor configured to:
generate a schedule that coordinates sensing operations performed by sensors of the central device and the one or more connected devices, and
distribute the schedule to the one or more connected devices causing the central device and the one or more connected devices to perform coordinated sensing operations according to the schedule.

15. The apparatus of claim 13, wherein the processor configured to coordinate sensing operations performed by sensors of the central device and the one or more connected devices further comprises the processor configured to:
cause one or more sensors of the central device to start data collection at the same time as one or more sensors of the one or more connected devices, based at least on the collected sensing intervals.

16. The apparatus of claim 13, wherein the processor configured to coordinate sensing operations performed by sensors of the central device and the one or more connected devices further comprises the processor configured to:
cause one or more sensors of the central device to perform data collection at intervals that overlap with data collection intervals of one or more sensors of the one or more connected devices, based at least on the collected sensing intervals.

17. The apparatus of claim 13, wherein the processor configured to coordinate sensing operations performed by sensors of the central device and the one or more connected devices further comprises the processor configured to, based at least on the collected sensor types:
cause each of a plurality of sensors of a same sensor type at different connected devices to start data collection at a different time than others of the plurality of sensors of the same sensor type, and
cause each of the plurality of sensors of the same sensor type to perform data collection at intervals which are temporally staggered with respect to data collection performed by others of the plurality of sensors of the same sensor type.

18. The apparatus of claim 13, further comprising the processor configured to:
collect data from the coordinated sensing operations performed by the one or more connected devices and the central device; and
perform a positioning process by the central device based, at least in part, on the data collected from the coordinated sensing operations.

19. The apparatus of claim 13, further comprising the processor configured to:
collect data from the coordinated sensing operations performed by the one or more connected devices and the central device; and
provide a location of the central device and the data collected from the coordinated sensing operations associated with the location to a crowdsourcing server.

20. The apparatus of claim 19, wherein the coordinated sensing operations comprises sensing by the one or more connected devices temporally aligned with an interval of crowdsourcing sensing performed by the central device.

21. The apparatus of claim 19, further comprising the processor configured to:
receive a request to perform on-demand crowdsourcing sensing;
delay sensing performed by the central device based on sensing intervals of the one or more connected devices; and
initiate sensing operations by the central device with the sensing operations performed by the one or more connected devices.

22. The apparatus of claim 13, wherein the apparatus is the central device, and wherein the central device comprises a smartphone, a controller of a motor vehicle, an access point, or a home controller.

23. The apparatus of claim 13, wherein the one or more connected devices comprise one or more of a smart watch, fitness tracker, smart glasses, smart garment, medical device, gaming device, or a combination thereof.

24. The apparatus of claim 13, wherein the apparatus is communicatively coupled with the one or more connected devices over a personal area network, a wireless local area network, or a combination thereof.

25. A system, comprising:
means for collecting sensing capabilities of one or more connected devices that are communicably coupled with a central device, wherein each connected device has one or more sensors, and wherein the sensing capabilities comprise at least sensor type and sensing interval for each sensor; and
means for coordinating sensing operations performed by sensors of the central device and the one or more connected devices.

26. The system of claim 25, wherein the means for coordinating sensing operations further comprises:
means for generating a schedule that coordinates sensing performed by sensors of the central device and the one or more connected devices; and
means for distributing the schedule to the one or more connected devices causing the central device and the one or more connected devices to perform coordinated sensing according to the schedule.

27. The system of claim 25, further comprising:
means for collecting data from the coordinated sensing operations performed by the one or more connected devices and the central device; and
means for performing a positioning process by the central device based, at least in part, on the data collected from the coordinated sensing.

28. The system of claim 25, further comprising:
means for collecting data from the coordinated sensing operations performed by the one or more connected devices and the central device; and
means for providing a location of the central device and the data collected from the coordinated sensing operations associated with the location to a crowdsourcing server.

29. The system of claim 25, wherein the system is the central device, and wherein the central device comprises a smartphone, a controller of a motor vehicle, an access point, or a home controller,
wherein the one or more connected devices comprise one or more of a smart watch, fitness tracker, smart glasses, smart garment, medical device, gaming device, or a combination thereof, and
wherein the central device is communicatively coupled with the one or more connected devices over a personal area network, a wireless local area network, or a combination thereof.

30. A non-transitory computer readable storage medium including instructions that, when executed by a processor, cause the processor to perform a method for synchronization of sensing operations performed by a plurality of devices, the method comprising:
collecting sensing capabilities of one or more connected devices that are communicably coupled with a central device, wherein each connected device has one or more sensors, and wherein the sensing capabilities comprise at least sensor type and sensing interval for each sensor; and
coordinating, by the central device, sensing operations performed by sensors of the central device and the one or more connected devices.

* * * * *